US011244411B2

(12) United States Patent
Goud et al.

(10) Patent No.: US 11,244,411 B2
(45) Date of Patent: Feb. 8, 2022

(54) INFORMATION PROCESSING SYSTEM, METHOD, AND COMPUTER READABLE MEDIUM FOR GRAPHICAL USER INTERFACE

(71) Applicant: NEC Display Solutions, Ltd., Tokyo (JP)

(72) Inventors: Suneel Goud, Los Altos, CA (US); Eric Scifres, Los Altos, CA (US)

(73) Assignee: SHARP NEC DISPLAY SOLUTIONS. LTD., Tokyo (JP)

( * ) Notice: Subject to any disclaimer, the term of this patent is extended or adjusted under 35 U.S.C. 154(b) by 0 days.

(21) Appl. No.: 16/835,036

(22) Filed: Mar. 30, 2020

(65) Prior Publication Data
US 2021/0304334 A1 Sep. 30, 2021

(51) Int. Cl.
*G06F 3/048* (2013.01)
*G06Q 50/16* (2012.01)
*G06F 3/0482* (2013.01)

(52) U.S. Cl.
CPC ......... *G06Q 50/163* (2013.01); *G06F 3/0482* (2013.01)

(58) Field of Classification Search
CPC .............. G06F 3/0482; G06F 3/04842; G06Q 30/0261; G06Q 30/0631; G06Q 30/0269; G06Q 30/0251; G06Q 30/0643; G06Q 50/163; G06Q 50/30
See application file for complete search history.

(56) References Cited

U.S. PATENT DOCUMENTS

| 5,852,810 | A  | * | 12/1998 | Sotiroff ............. G06Q 30/0625 705/26.8 |
| 6,397,208 | B1 | * | 5/2002 | Lee ....................... G06Q 30/02 707/724 |
| 9,282,161 | B1 | * | 3/2016 | Hill ......................... H04L 67/18 |
| 10,803,536 | B1 | * | 10/2020 | Bachia ................ G01C 21/343 |
| 2005/0251331 | A1 | * | 11/2005 | Kreft ..................... G01C 21/00 701/438 |
| 2006/0287810 | A1 | * | 12/2006 | Sadri ..................... G01C 21/20 701/438 |
| 2008/0065429 | A1 |   | 3/2008 | Galloway |
| 2008/0307512 | A1 | * | 12/2008 | Tandon .................. G06Q 30/06 726/4 |
| 2009/0100018 | A1 | * | 4/2009 | Roberts .................. G06F 16/29 |
| 2009/0177523 | A1 | * | 7/2009 | Routtenberg ......... H04W 4/029 705/7.34 |
| 2009/0318168 | A1 | * | 12/2009 | Khosravy ............. H04W 4/026 455/456.3 |

(Continued)

*Primary Examiner* — Hua Lu
(74) *Attorney, Agent, or Firm* — Sughrue Mion, PLLC

(57) ABSTRACT

A method includes displaying attraction information that identifies at least a plurality of candidate attractions, wherein the candidate attractions are attractions that are not previously recommended; receiving a first user input comprising a selection of a single candidate attraction among the plurality of candidate attractions; displaying property information that identifies a plurality of properties after receiving the first user input; receiving a second user input comprising a selection of one or more properties among the plurality of properties; and associating the selected candidate attraction and the selected one or more properties to permit respective devices disposed at the one or more properties to display information of the selected candidate attraction.

27 Claims, 12 Drawing Sheets

(56) References Cited

U.S. PATENT DOCUMENTS

| | | | | |
|---|---|---|---|---|
| 2010/0332324 A1* | 12/2010 | Khosravy | | G06Q 30/00 |
| | | | | 705/14.53 |
| 2011/0059759 A1* | 3/2011 | Ban | | H04L 67/04 |
| | | | | 455/466 |
| 2011/0289106 A1* | 11/2011 | Rankin, Jr. | | G06F 16/284 |
| | | | | 707/769 |
| 2013/0039631 A1* | 2/2013 | Hovagim | | H04N 21/47202 |
| | | | | 386/200 |
| 2013/0063488 A1* | 3/2013 | Gaebler | | G01C 21/3679 |
| | | | | 345/636 |
| 2013/0110633 A1* | 5/2013 | Waldman | | G01C 21/20 |
| | | | | 705/14.58 |
| 2013/0205257 A1* | 8/2013 | Albright | | G01C 21/206 |
| | | | | 715/810 |
| 2015/0081350 A1* | 3/2015 | Truong | | G06Q 50/14 |
| | | | | 705/5 |
| 2015/0169336 A1* | 6/2015 | Harper | | G10L 15/22 |
| | | | | 715/706 |
| 2015/0193864 A1 | 7/2015 | Allison et al. | | |
| 2015/0199754 A1 | 7/2015 | Greystoke et al. | | |
| 2015/0204688 A1* | 7/2015 | Gearhart | | G01C 21/3679 |
| | | | | 701/540 |
| 2017/0076365 A1* | 3/2017 | D'Souza | | G06Q 50/08 |
| 2017/0223504 A1* | 8/2017 | Miller | | G01C 21/3667 |
| 2017/0285903 A1* | 10/2017 | Duong | | G06F 3/04842 |
| 2017/0351417 A1* | 12/2017 | Manico | | G06F 16/50 |
| 2018/0101821 A1 | 4/2018 | Ward | | |
| 2019/0156538 A1* | 5/2019 | Mongrain | | G06T 3/20 |
| 2020/0026279 A1* | 1/2020 | Rhodes | | G01C 21/3476 |
| 2020/0043073 A1* | 2/2020 | Greenberger | | G06Q 10/0836 |
| 2020/0234380 A1* | 7/2020 | Dulori | | G06Q 40/08 |
| 2020/0378785 A1* | 12/2020 | Haney | | G01C 21/3614 |
| 2021/0034993 A1* | 2/2021 | Fan | | G06Q 50/00 |
| 2021/0142564 A1* | 5/2021 | Impas | | G06T 17/05 |

\* cited by examiner

INFORMATION PROCESSING SYSTEM, METHOD, AND COMPUTER READABLE MEDIUM FOR GRAPHICAL USER INTERFACE

FIELD

This disclosure relates to an information processing apparatus, an information processing method, and a storage medium. More particularly, it relates to an information processing apparatus, an information processing method, and a storage medium for providing a graphical user interface that can assist with associating properties with attractions.

BACKGROUND

Some systems provide a Property Manager (PM) with a console that can help the PM with tasks for managing a property. Some consoles allow the PM to provide information to guests staying at the property by transmitting the information to a computer at the property. The computer controls a display located in a property which displays the information to the guests. Such a console can allow a PM to communicate with the guests by way of the display located in the property.

PMs using such consoles have a need to easily, properly, and quickly manage making many recommendations for many properties to provide better guest experience.

SUMMARY

The present disclosure is directed to a methods of generating a graphical user interface (GUI) that facilitates associating a plurality of properties with a one or more attractions to display information about those attractions at the plurality of properties.

According to some possible implementations, a method of generating a graphical user interface (GUI) includes displaying attraction information that identifies at least a plurality of candidate attractions, wherein the candidate attractions are attractions that are not previously recommended; receiving a first user input comprising a selection of at least a single candidate attraction among the plurality of candidate attractions; displaying property information that identifies a plurality of properties after receiving the first user input; receiving a second user input comprising a selection of one or more properties among the plurality of properties; and associating the selected candidate attraction and the selected one or more properties to permit respective devices disposed at the one or more properties to display information of the selected candidate attraction.

According to some possible implementations, a non-transitory computer-readable medium stores instructions, the instructions comprising: one or more instructions that, when executed by one or more processors of a device, cause the one or more processors to display attraction information that identifies at least a plurality of candidate attractions, wherein the candidate attractions are attractions that are not previously recommended; receive a first user input comprising a selection of at least a single candidate attraction among the plurality of candidate attractions; display property information that identifies a plurality of properties after receiving the first user input; receive a second user input comprising a selection of one or more properties among the plurality of properties; and associate the selected candidate attraction and the selected one or more properties to permit respective devices disposed at the one or more properties to display information of the selected candidate attraction.

According to other possible implementations, a method includes providing, by a server and to a management device, attraction information that identifies at least a plurality of candidate attractions to permit the management device to display the attraction information, wherein the candidate attractions are attractions that are not previously recommended; receiving, by the server and from the management device, a selected candidate attraction based on a first user input to the management device comprising a selection of at least a single candidate attraction among the plurality of candidate attractions; providing, by a server and to the management device, property information that identifies a plurality of properties to permit the management device to display the property information after receiving the first user input by the management device; receiving, by the server and from the management device, selection information that identifies a user selection of one or more properties among the plurality of properties based on a second user input to the management device; and providing, by the server, association information that associates the selected candidate attraction and the selected one or more properties based on the selection information.

BRIEF DESCRIPTION OF THE DRAWINGS

One or more example embodiments of the disclosure will be described below with reference to the drawings. Throughout the drawings, the same components or corresponding components are labeled with the same reference numerals, and, accordingly, the description thereof may be omitted or simplified.

DETAILED DESCRIPTION

A guest guide, according to certain exemplary embodiments of this application, can act as a virtual concierge that helps property managers (PMs) of properties, such as vacation rental properties, create and deliver exceptional guest experiences, increase profitability, and improve the operational efficiencies of their business. The guest guide can allow PMs to provide guests with high-touch customer service with minimal direct guest-PM interactions. A guest guide according to certain exemplary embodiments, can achieve this by delivering 1) helpful information about the rental property and the local area near the property, 2) special discounts at local businesses and attractions, 3) a mechanism for guests to book and pay for services and activities, and 4) a convenient, non-intrusive medium for PMs to send updates/notifications to their guests.

There is a need for a PM to be able to quickly and efficiently add recommendations for attractions that may be applicable to multiple properties managed by the PM. Some embodiments of the guest guide generate a graphical user interface (GUI) that allows a PM to easily recommend an attraction to guests staying at a plurality of properties managed by the PM. In some cases, PMs manage many properties, making it difficult and time consuming to recommend an attraction to guests staying at those properties. Embodiments that generate the improved GUI for a guest guide provide a technical solution to recommending an attraction to guests at a plurality of properties managed by a PM. Such a technical solution can ease the burden on a PM managing a plurality of properties by reducing, if not eliminating, the need to repetitively recommend the same attraction to multiple managed properties.

Certain embodiments of the guest guide are an extensible and scalable content distribution system that has four distinct components, including 1) a large touch-enabled PC housed in a digital picture, which may include two (2) speakers, (2) microphones, and a passive infrared (PIR) and light sensor, 2) a web application that runs on a CHROMIUM browser, 3) a web based management application, and 4) a cloud-based web service.

The web-based management application can serve as the "mission control center" for the PM. From this application, the PM can upload and synchronize property and reservation details, make recommendations, input information about other services the PM offers, promote other businesses in the area, and a variety of other functions.

Figure 1:
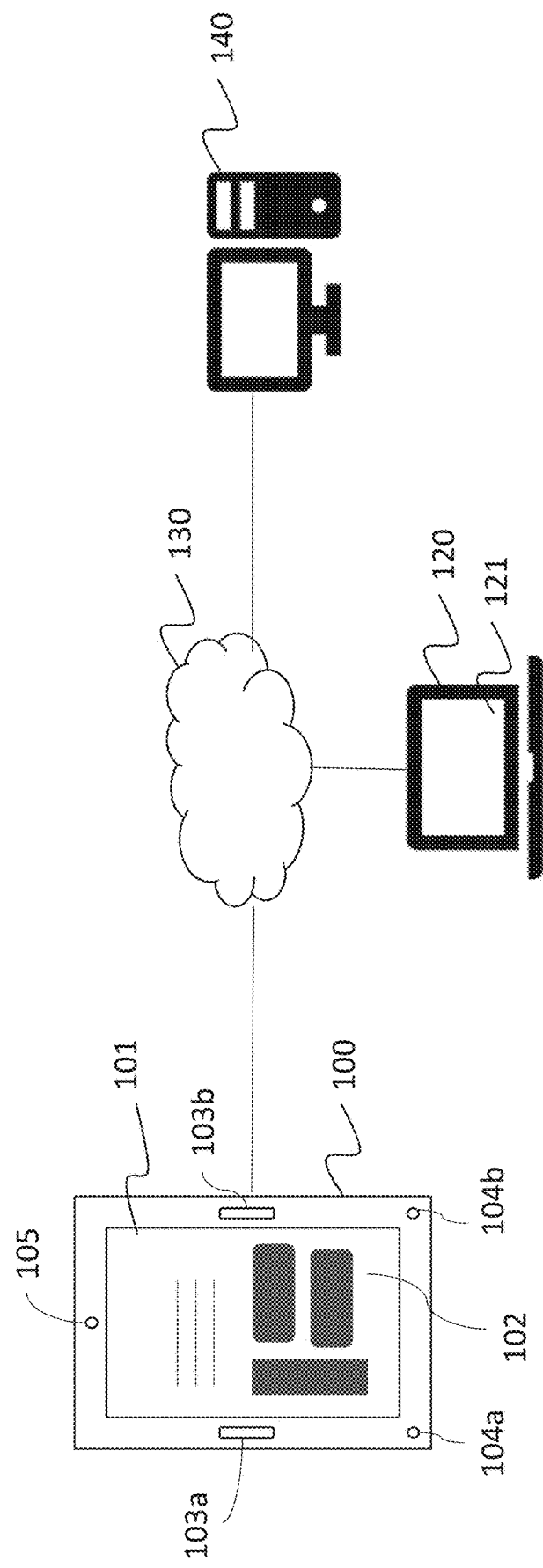
FIG. 1 is a diagram illustrating an overview of a guest guide system and showing an example environment in which systems and/or methods, described herein, may be implemented.

FIG. 1 is a diagram of an exemplary embodiment, described herein, that shows an overview of a guest guide system which represents a hardware and software platform solution. The system includes a digital picture 100 which is placed in an accommodation such as a rental property. The digital picture includes a display screen 101, which can be a touch screen display. The digital picture 100 and display screen 101 allow a front end application to operate a graphical user interface (GUI) 102 to facilitate a guest interacting with the property. Coupled to or integrated with the digital picture is it a computer, not shown, which includes a processor, memory, control circuitry, programs, and communication interfaces. The digital picture 100 can include other optional devices for allowing a guest to interact with the digital picture. Such optional devices can include speakers 103a and 103b, microphones 104a and 104b, and a camera 105. These devices can facilitate a user interacting with the system through the digital picture.

The digital picture 100 is coupled to a network 130, such as the Internet or a private network, that allows for communication with a server 140 and in some instances to a management console (MC) 120. A property manager (PM) can utilize the MC to access an MC web site hosted at the server 140 to make recommendations for attractions (such as restaurant recommendations, unique local events, etc.) and select properties where the PM wants to display the recommended attractions. The MC 120 communicates with the server 140 through the network 130. When a new property is added on the MC web site, the MC can show recommendations that have already been made by the PM so that PM can easily select attractions to recommend for the new property.

The MC 120 is used by a property manager to manage the information displayed on the digital picture 100 at a property. The MC 120 includes a computer on which a MC graphical user interface (GUI) 121 is displayed for the web site hosted at the server 140. The MC GUI 121 is used by a property manager to control the information displayed on the digital picture 100. The MC is connected through network 130 to the server 140 and in some instances to the digital picture 100. The server 140 stores information concerning the properties managed and the attractions recommended for those properties.

PMs want to easily and properly manage many recommendations for many properties to provide better guest experiences. The improved MC, according to exemplary embodiments described here, can provide an easier and more efficient way to manage recommended attractions for a plurality of properties. Two processes that can increase the PM's efficiency are described next: i) adding a new recommended attraction process and ii) adding a new property process.

Figure 2:
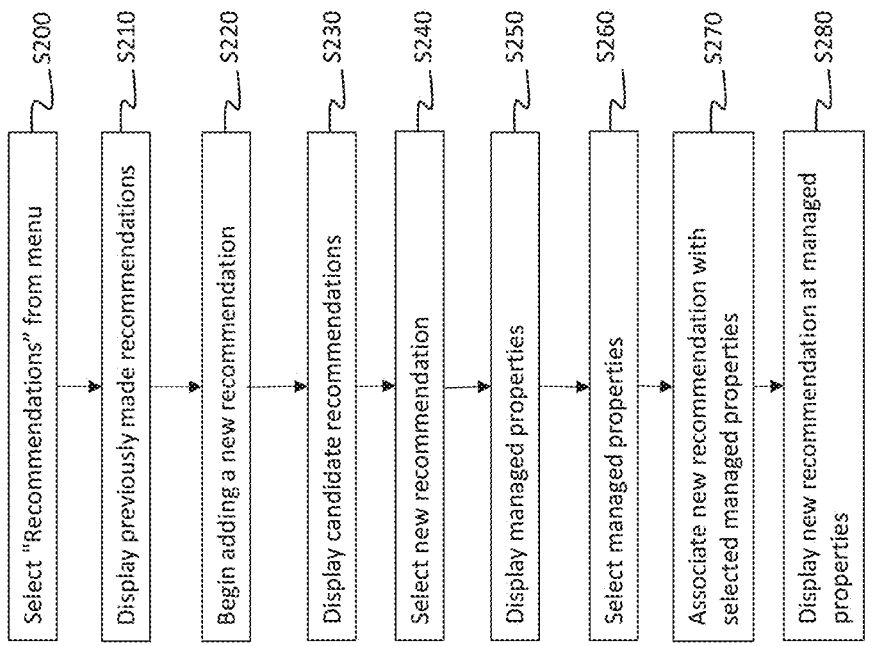
FIG. 2 is flow diagram for an algorithm used by a management console (MC) for adding new attractions and associating them with properties managed by a property manager (PM).
Figure 3A:
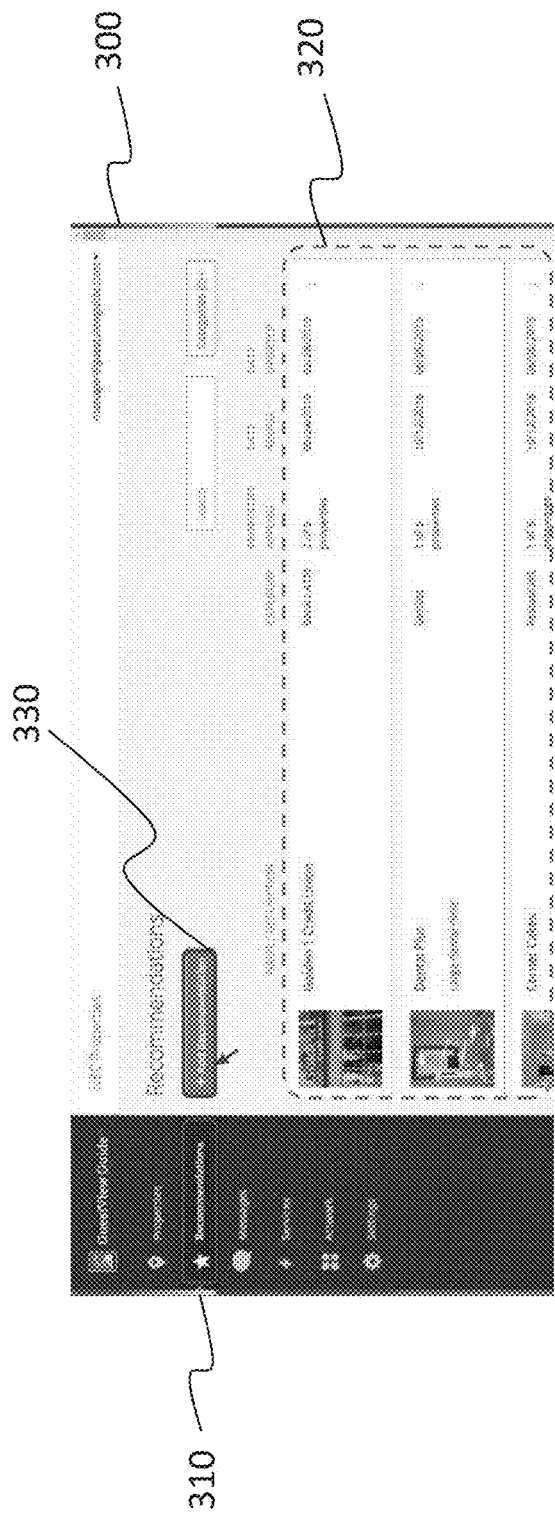
FIG. 3A illustrates a recommendation screen for an MC graphical user interface (GUI)
Figure 3B:
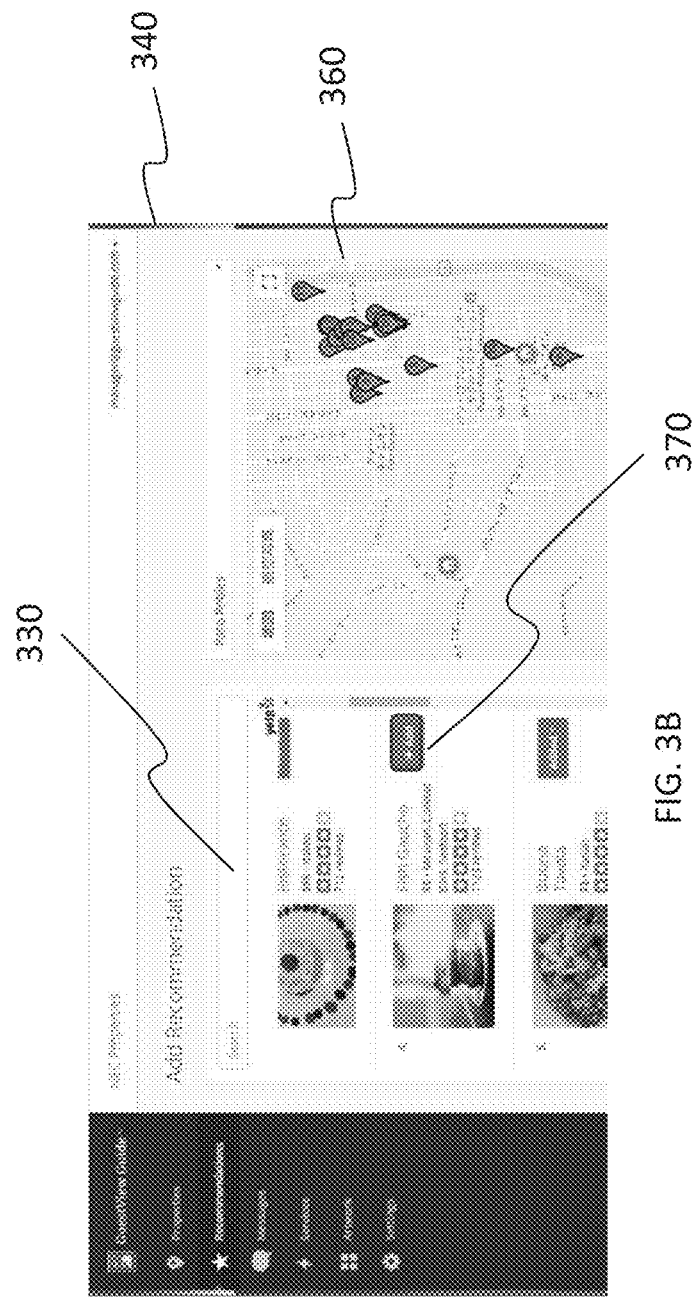
FIG. 3B illustrates an add-recommendation screen for the MC GUI.
Figure 3C:
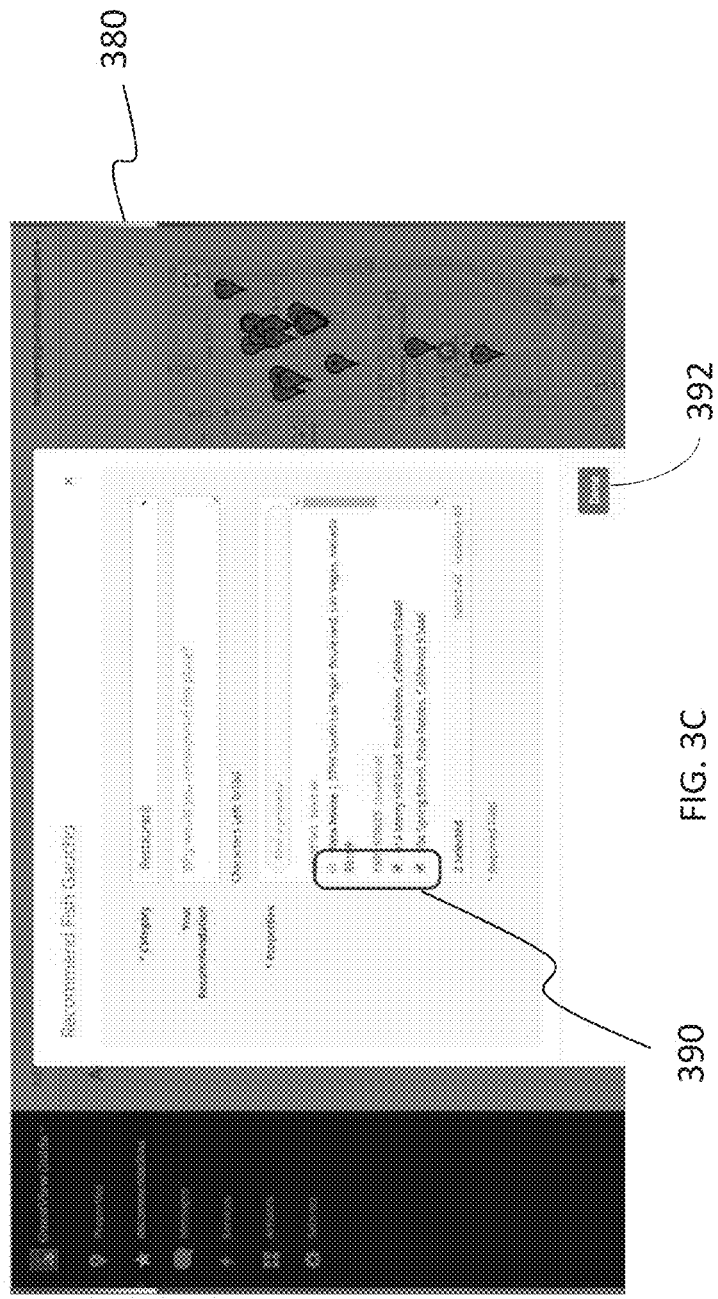
FIG. 3C illustrates a recommendation-selection screen for the MC GUI.

An exemplary embodiment of an algorithm for controlling the GUI 102 to add a new attraction, which can be recommended to guests at properties managed by a PM, is shown in FIG. 2. Examples of screens that can be displayed on the GUI are shown in FIGS. 3A, 3B and 3C. Referring to FIG. 2, a PM can use the CM GUI 121 to add a recommended attraction to the guest guide. FIG. 3A shows an exemplary embodiment of a recommendation screen 300, which includes a menu on the left side of the screen and an area for displaying recommended attractions 320. The menu includes a menu recommendation control 310. Referring to FIG. 2, a PM can select the menu recommendation control 310 from the menu (S200), by clicking on the control 310. Upon clicking the menu recommendation control 310, a list of attractions that have been designated for recommendation to one or more properties managed by the PM are shown in the recommended attractions area 320 of the GUI (S210). As seen in FIG. 3A, three attractions have previously been designated for recommendation for certain properties. These attractions are listed in area 320.

If the PM wants to add a new attraction recommendation, the PM selects the add recommendation control 330 (S220). In response to selecting this control, the GUI displays an add-recommendation screen 340, as shown in FIG. 3B. This screen includes a list of candidate attractions 350 that may be selected for recommendation (S230). In one example, the candidate attractions can be restaurants located within a certain area. In some embodiments, a map 360 showing the locations of the candidate attractions is displayed on the GUI. Data for the candidate attractions can come from a variety of sources. In one embodiment, the candidate attraction data can be supplied by the server 140. In other embodiments, the candidate attraction data also can come from outside sources, such as YELP, OPENWEATHER, or other online sources. The PM can choose one of the candidate attractions by selecting the add-specific-recommendation control 370, such as the +Add button shown in FIG. 3B (S240). In the embodiment shown in FIG. 3B, the PM selects the candidate restaurant Fish Gaucho to be a recommended attraction.

Upon selecting the +Add button, the GUI displays a recommendation selection screen 380, which displays the properties managed by the PM (S250). This screen allows the PM to associate the selected candidate attraction, in this case the Fish Gaucho restaurant, with a plurality of properties managed by the PM. The screen includes property-selection controls 390 for each of the properties managed by the PM. In the embodiment shown in FIG. 3C, the controls are checkboxes. The PM can select one or more of managed properties by clicking on one or more checkboxes corresponding to those properties (S260). By displaying checkboxes for a plurality of manage properties, the PM can quickly and efficiently associate the new attraction with more than one managed property in a single operation, thereby saving time and easing the management of the properties.

Figure 4:
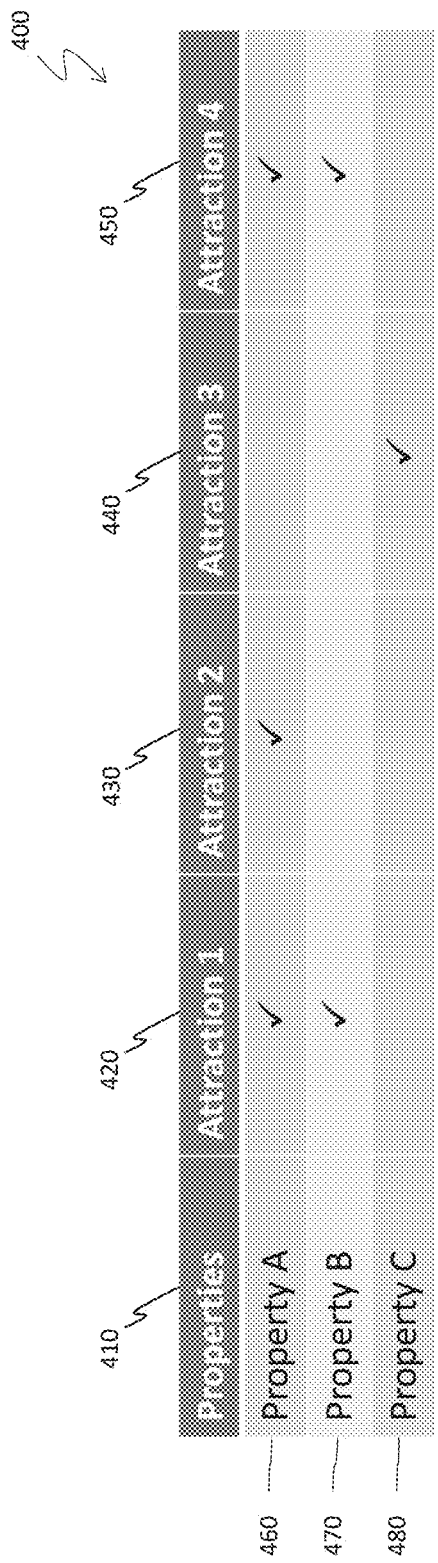
FIG. 4 is an illustration of a property-attraction data structure.

Once the PM has selected the managed properties to associate with the new attraction, the PM selects the Done button 392. This causes the GUI to update a data structure at server 140 that associates managed properties with recommended attractions (S270). FIG. 4 illustrates such a data structure, which shows an exemplary embodiment of a table 400 that relates managed properties 410 with recommended attractions 420, 430, 440, 450. In the embodiment shown in FIG. 4, the table has a row for each managed properly. If the PM has recommended an attraction for a property, the row for that property has an indication that the attraction is recommended for that property. In the table shown in FIG. 4, a check mark indicates that an attraction is recommended for a property. For example, prior to adding the new attraction, Attractions 1 and 2 are recommended for Property A 460, Attraction 1 is recommended for Property B 470, and Attraction 3 is recommended for Property C 480. Upon adding the new attraction, Attraction 4, a new column 450 is added to the table for Attraction 4. In this example, the Fish Gaucho restaurant is added as Attraction 4. In the recommendation-selection screen 380, the PM selects two properties, Property A and Property B, to receive a recommendation for the Fish Gaucho restaurant. An indication is added in the table to associate the Fish Gaucho restaurant (Attraction 4) with Properties A and B illustrated in FIG. 4 by checkmarks. The updated table 400 is stored in the server 140.

The front end application GUI 102 displayed on the digital picture 100 at Property A, is updated to display the new the Fish Gaucho restaurant recommendation (S280). Likewise, the front end application GUI 102 displayed on the digital true picture 100 at Property B, also is updated to display the new Fish Gaucho restaurant recommendation (S280).

Figure 5:
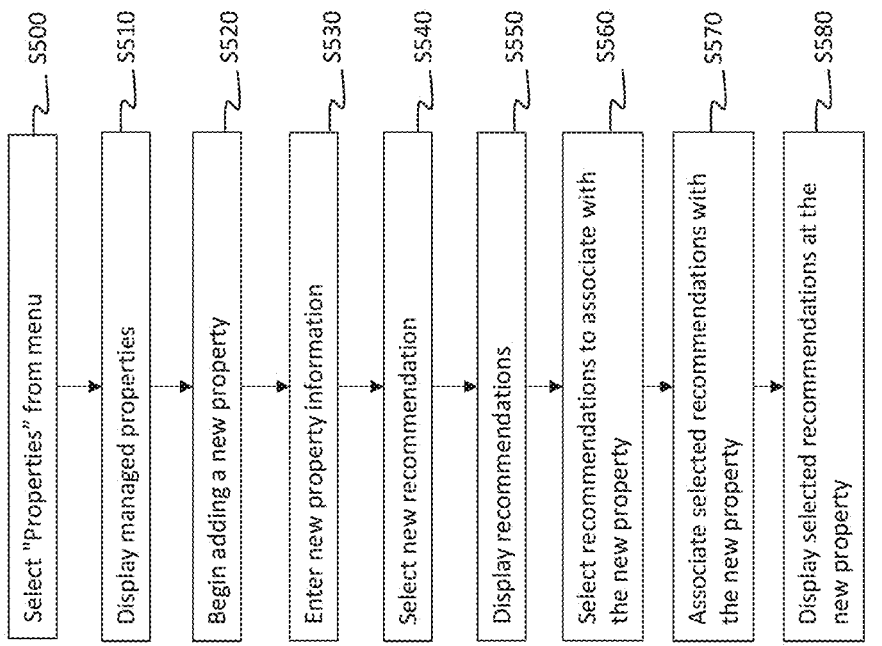
FIG. 5 is flow diagram for an algorithm used by the MC for adding a new property managed by a property manager (PM) and associating it with previously recommended attractions.
Figure 6A:
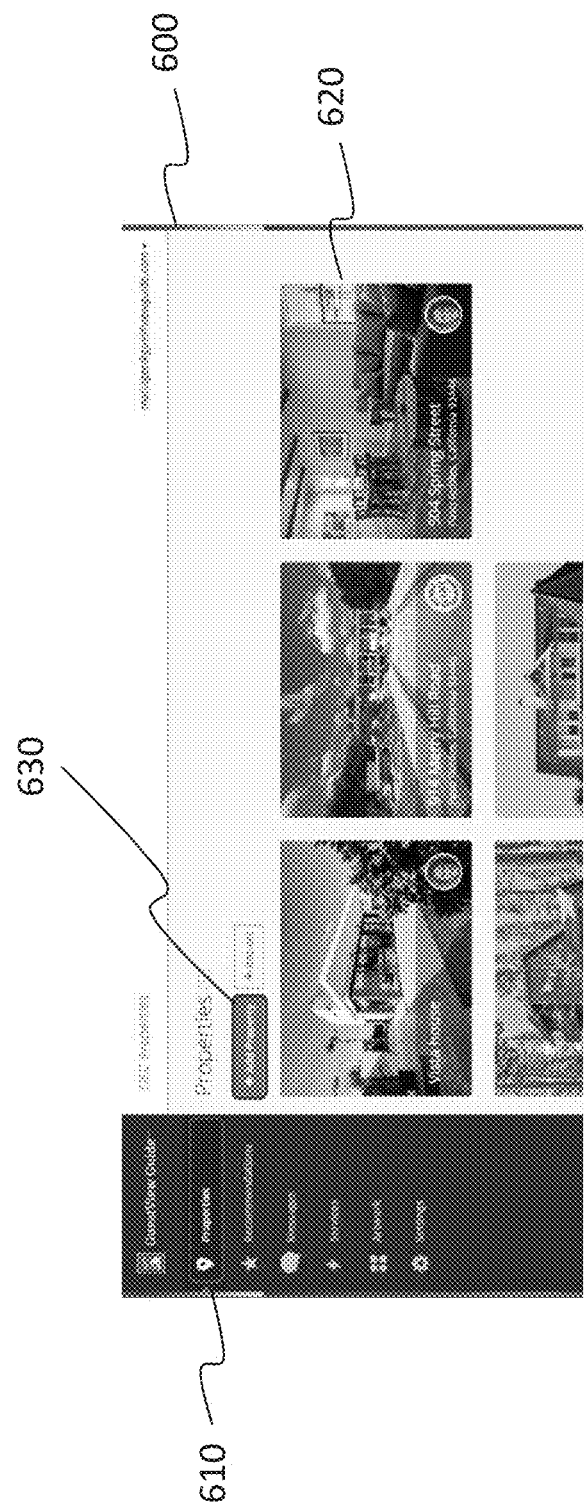
FIG. 6A illustrates a managed-properties screen for the MC GUI.
Figure 6B:
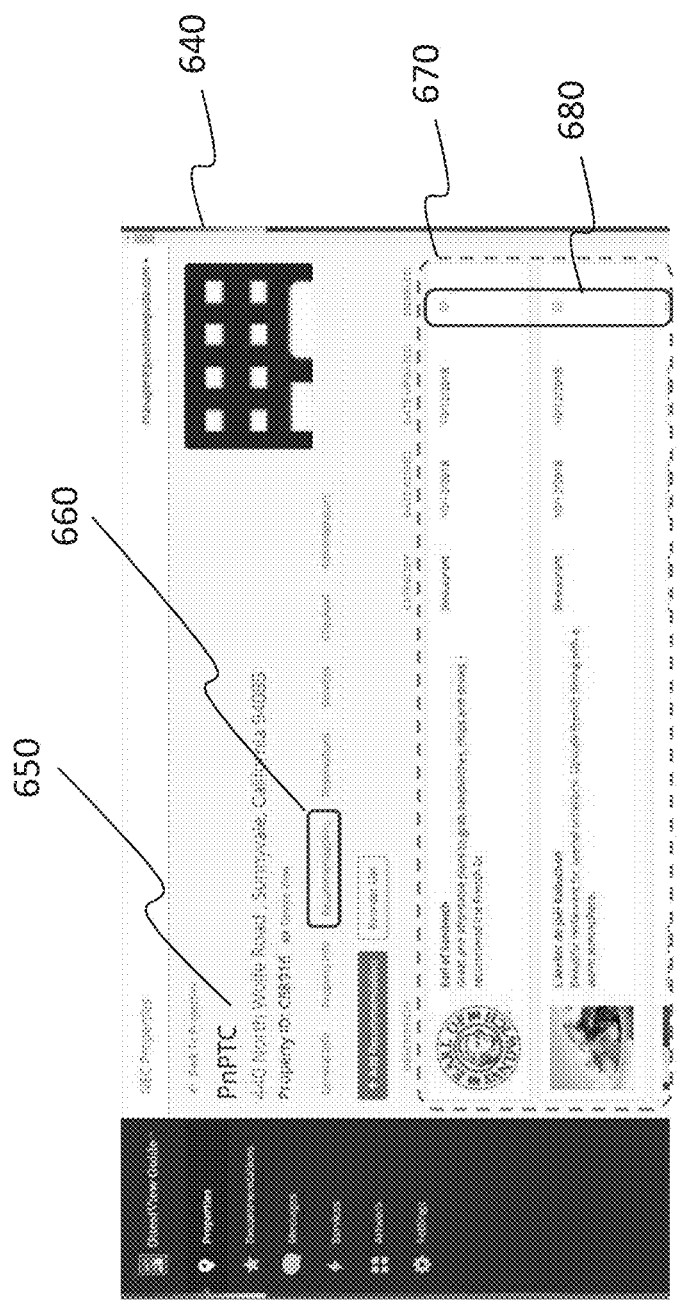
FIG. 6B illustrates a property-attraction screen for the MC GUI.

An exemplary embodiment of an algorithm for controlling the MC GUI 121 to add a new property to the guest guide system is shown in FIG. 5. Examples of screens that can be displayed on the MC GUI 121 are shown in FIGS. 6A and 6B. Referring to FIG. 5, a PM can use the MC GUI 121 to add a new property to the collection of properties managed by the PM. FIG. 6A shows an exemplary embodiment of a managed-properties screen 600, which includes a menu that includes a property control (Properties) 610. When the PM selects the property control by clicking "Properties" (S500), a list of managed properties 620 is displayed (S510). In some embodiments, the list of managed properties is displayed in a single screen. In some embodiments the managed properties are displayed showing pictures of the properties along with other information about the properties. The PM can start to add a new property by selecting an add-properties control (+Add Property) 630 (S520). In some cases, the property being added is not a property being newly managed, but is a property under management in which a digital picture 100 is newly installed, allowing it to receive digital information from the server 140.

Upon selecting +Add Property 630, the GUI displays a property-attraction screen 640, shown in FIG. 6B. This screen includes a property-information field 650 in which information about the property is entered, such as the property name and address (S530). The screen incudes a recommendation control 660 (Recommendations), that when selected (S540) displays a list of recommended attractions 670 (S550). The list shows information about attractions that have been recommended for other properties managed by the PM. For each property in the list 670, an attraction selection control 680, such as a selection box, is displayed. By displaying a plurality of previously recommended attractions, the PM can quickly and efficiently select one or more of the previously recommended attractions for the new property (S560).

In some embodiments, in step S550, the list of recommended attractions 670 can be filtered to choose recommended attractions that relate to the added property according to some criteria. For example, the criteria for displaying recommended attractions can be to display attractions that are located within a threshold distance from the property. In certain embodiments the threshold distance is set by the PM and retained in the server 140. In other embodiments, a plurality of managed properties can be selected and one or more attractions located a threshold distance from the plurality of properties is displayed in the MC GUI. In this way, the PM can associate one or more attractions with one or more managed properties.

Figure 7:
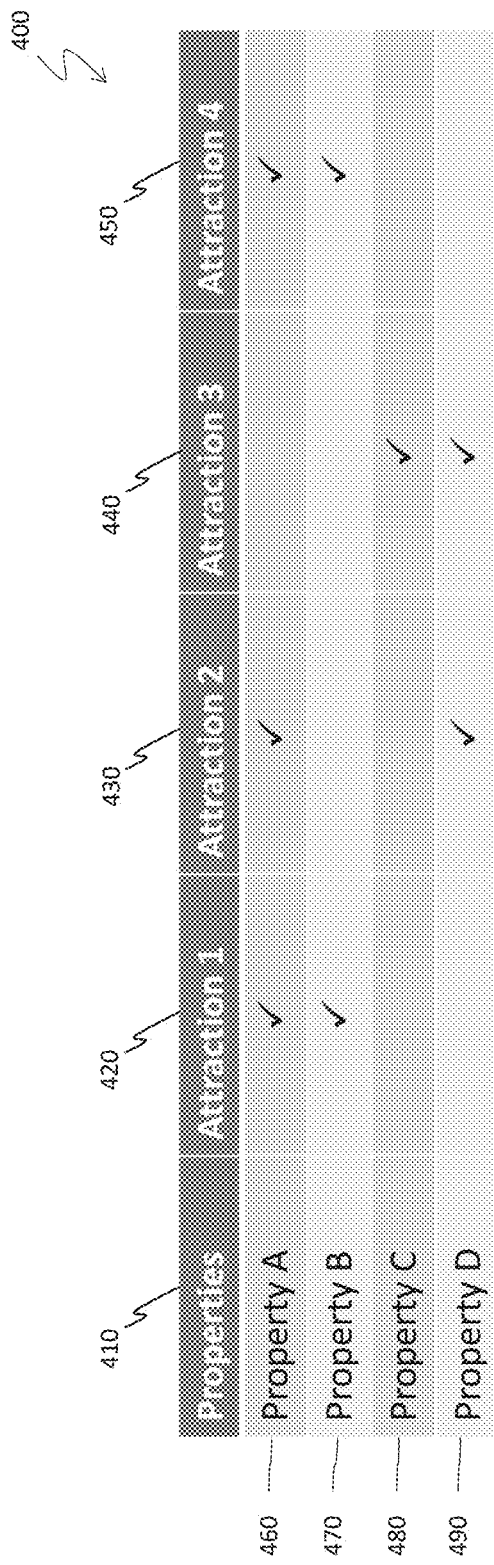
FIG. 7 is an illustration of the property-attraction data structure.

Upon selecting previously recommended attractions for the new property, the MC GUI communicates with the server 140 to update the table 400 by associating the selected attractions with the new property (S570). FIG. 7 shows the table 400 with the new property, Property D 490, added to the table 400. In this embodiment, the PM selected two previously recommended attractions (Attraction 2 and Attraction 3). The table 400 is updated by indicating in that Attractions 2 and 3 are associated with Property D. Certain embodiments of the MC send a message to the server 140 to update the table 400 with the new property-attractions associations. The server 140 then can update the web page for Property D to display recommendations for Attractions 2 and 3 (S580).

In certain embodiments, the plurality of properties may be rental properties available for rent by a tenant, such as short term rentals for vacation properties, for example, or longer term rentals.

Figure 8:
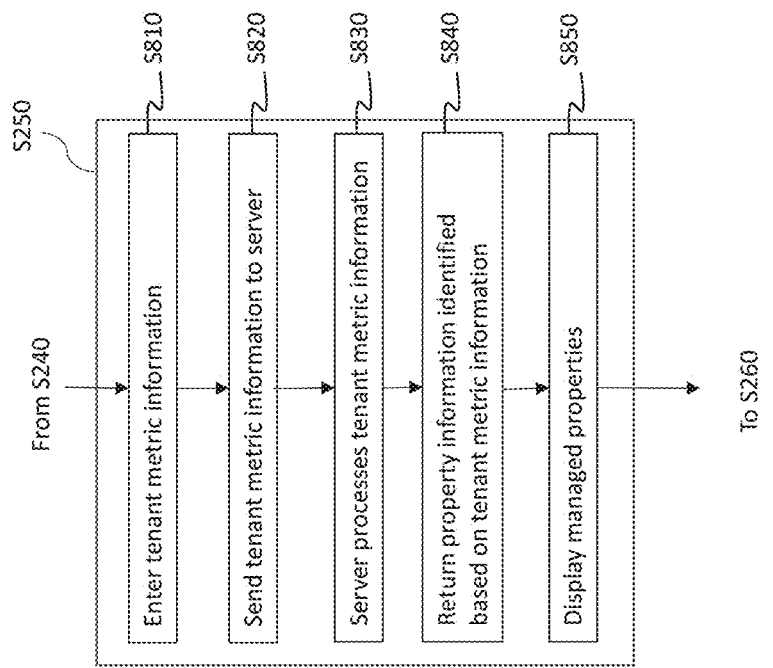
FIG. 8 is a flow diagram of a process for identifying properties to display based on tenant metric information.

In another embodiment, the PM may receive tenant metric information that can be used to identify properties with tenants who are likely to be interested in an attraction. This feature is an alternative embodiment to step S250 in FIG. 2 of displaying managed properties, and is illustrated in more detail in FIG. 8. Examples of the tenant metric may include the age of the tenant, a budget for the tenant, the sex of the tenant, an interest of the tenant, and a rental history of the tenant. The PM can enter this tenant metric information via the MC GUI (S810) which provides the entered tenant metric information to the server 140 (S820). The server 140 can process the tenant metric information in a variety of ways to provide information to the PM to assist with recommending an attraction for one or more of the managed properties (S830). In certain exemplary embodiments, the server processes the tenant metric information by applying it to algorithms, models, artificial intelligence and/or machine learning systems. The result of this processing can identify one or more properties, among the managed properties, which have tenants who are likely to be interested in the subject attraction. For example, the server can generate property information that is based on the managed properties that are associated with respective tenants who correspond with the tenant metric. The server then returns that property information to the MC (S840) which displays it on the MC GUI (S850). An example of a new attraction a PM may want to recommend to certain tenants in the managed properties is Carl's Go Kart Speedway. The PM may enter the following tenant metrics into the MC GUI, tenant age: 11-18 years old; tenant sex: male; and interest of tenant: motorsports. This tenant information is sent to the server 140 which processes the information. The server operates on this tenant information to find several of the managed properties with tenants who have teenage boys and who have indicated an interest in motorsports. For example, the server might identify three (3) of the managed properties with such tenants. Upon receiving this property information, the MC GUI displays the properties indicated by the returned property information in the list of properties on the recommendation-selection screen 380, shown in FIG. 3C. The PM then can easily and quickly select all three properties to recommend the attraction. After selecting the properties, the PM sends the selection to the server 140, which cause information about Carl's Go Kart Speedway to be displayed in the recommended attractions area on the digital pictures 100 in each of the three (3) identified properties.

Figure 9:
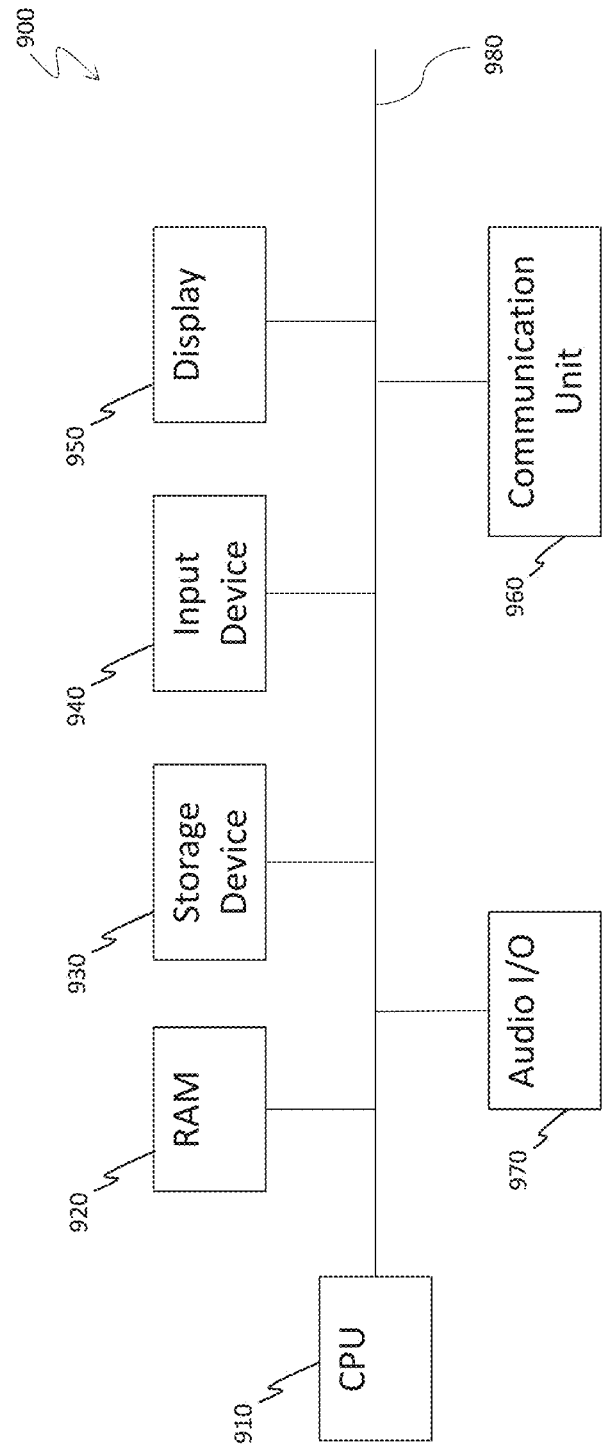
FIG. 9 is a diagram of an exemplary embodiment of the hardware structure for a digital picture computing device, an MC, or a server.

FIG. 9 shows an exemplary embodiment of a hardware computing structure 900 that can implement the digital picture 100, the MC 120, or the server 140. Some of the elements of the computing structure 900 shown in FIG. 9 may not be used in certain implementations of the digital picture 100, the MC 120, and the server 140, which will be dependent upon the application.

As illustrated in FIG. 9, the hardware computing structure 900 has one or more processors, which can be implemented by one or more CPUs 910, one or more random access memories (RAM) 920, one or more storage devices 930, one or more input devices 940, one or more displays 950, a communication unit 960, and an audio input/output (I/O) device 970. The input device 940 can interface with a camera 105 shown in FIG. 1. The audio I/O device 970 can interface with one or more speakers 103a and 103b, and one or more microphones 104a and 104b shown in FIG. 1. The CPU 910, the RAM 920, the storage device 930, the input device 940, the display 950, the communication unit 960, and the audio I/O device 970 are connected to and communicate by a computer bus 980.

The CPU 910 may function as a control unit that operates by executing a program, such as an operating system (OS), stored in the storage device 930 and controls the operation of the entire digital picture 100, management console 120, or server 140. Further, the CPU 910 may execute an application program stored in the storage device 930 to perform various processes of the digital picture 100, management console 120, or server 140. The RAM 920 may provide a memory area necessary for the operation of the CPU 910.

The storage device 930 may be formed by a storage medium such as a nonvolatile memory, a hard disk drive, or the like, and functions as a storage unit. The storage device 930 may store a program executed by the CPU 910, data referenced or operated on by the CPU 910 when the program is executed, or the like.

The input device 940 can be, for example, a keyboard, a pointing device, a touchscreen embedded in the display 950, or other devices that function as an input unit that accepts input from a user.

The display 110 may function as a display unit that displays various windows to a user using the digital picture 100, management console 120, or server 140. For example, the display 950 can display the MC GUI screens described herein, or the when used with digital picture 100 can display to guests in a property web pages hosted by the server 140 which can include the recommendations made by the PM. The display 950 also can display other information such as a notification window to the user, or the like.

The communication unit 960 may be connected to a network 130, such as the Internet or other wide area network, and can transmit and receive data via the network. For example, the communication unit 960 in the MC 120 allows the MC 120 to communicate with the server 140, and the respective communication units 960 in the digital picture 100 and server 140 allows those devices to communicate with each other and permits, for example, the web pages hosted by the server 140, which can include the recommendations made by the PM using the MC, to be sent to the digital picture 100 where they can be displayed to a guest in the property where the digital picture 100 is located.

The functions of the server 140, shown in FIG. 1, in some instances may be implemented by a cloud server or a group of cloud servers. In some implementations, the functions of the server 140 may be designed to be modular such that certain software components may be swapped in or out depending on a particular need. As such, the server 140 may be easily and/or quickly reconfigured for different uses.

In some implementations, the functions of the server 140 may be hosted in a cloud computing environment. Notably, while implementations described herein describe the functions of server 140 as being implemented in one or more computers, in some implementations, the functions of the platform 140 may be cloud-based (i.e., may be implemented within a cloud computing environment) or may be partially cloud-based.

Such a cloud computing environment includes an environment that hosts the functions of the server 140. The cloud computing environment may provide computation, software, data access, storage, etc. services that do not require end-user (e.g., a user device) knowledge of a physical location and configuration of system(s) and/or device(s) that hosts the functions of the server 140. The cloud computing environment may include a group of computing resources (referred to collectively as "computing resources" and individually as "computing resource").

Such computing resources include one or more personal computers, workstation computers, server devices, or other types of computation and/or communication devices. In some implementations, the computing resources may host the server 140. The cloud resources may include compute instances executing in the computing resources, storage devices provided in the computing resources, data transfer devices provided by the computing resource, etc. In some implementations, the computing resources may communicate with other computing resources via wired connections, wireless connections, or a combination of wired and wireless connections.

The computing resources may include a group of cloud resources, such as one or more applications ("APPs"), one or more virtual machines ("VMs"), virtualized storage ("VSs"), one or more hypervisors ("HYPs"), or the like.

In some implementations, the functions of the MC 120, shown in FIG. 1, may be implemented by the server 140, which may be a cloud server, and the MC implemented by a thin-client, such as a terminal.

The disclosure is not limited to the example embodiments described above but can be changed as appropriate within a range not departing from the spirit of the disclosure.

While the information processing apparatus and systems used in a GUI for a management console for managing properties have been illustrated as examples in each of the above described embodiments, the disclosure also is applicable to managing assets other than properties by appropriately changing the configuration of the one or more of the example embodiments.

The scope of one or more exemplary embodiments also includes a processing method of storing, in a storage medium, a program that causes the configuration of the embodiment to operate to implement the functions of the embodiments described above, reading out as a code the program stored in the storage medium, and executing the code by a processor, such as a CPU. That is, a computer readable storage medium is also included in the scope of each example embodiments. Further, not only the storage medium in which the program described above is stored but also the program itself is included in each example embodiment. Further, one or more components included in the example embodiments described above may be a circuit such as an Application Specific Integrated Circuit (ASIC), a Field Programmable Gate Array (FPGA), or the like configured to implement the functions of each component.

Examples of a storage medium that can be used to implement the embodiments described herein include, for example, a floppy (registered trademark) disk, a hard disk, an optical disk, a magneto-optical disk, a Compact Disk (CD)-ROM, a magnetic tape, a nonvolatile memory card, a ROM can be used, or any other non-transitory computer readable storage medium. Further, certain of the exemplary embodiments can be implemented as software that operates as part of an Operating System (OS), in conjunction with computer hardware, to perform a process in cooperation with other software or as part of an add-in board, without being limited to an embodiment of an individual program stored in the storage medium that performs one or more of the processes described herein. One or more of the exemplary embodiments described herein also can be provided to the user in the form of Software as a Service (SaaS).

Note that all the exemplary embodiments described herein are mere examples of embodiments that implement the disclosed features, and the technical scope of the disclosure should not be construed in a limiting sense by these exemplary embodiments. That is, the disclosure can be implemented in various forms without departing from the technical concept thereof or the primary features thereof.

The whole or part of the example embodiments disclosed above can be described as, but not limited to, the following supplementary notes.

[Supplemental Note 1]

A method of generating a graphical user interface (GUI), comprising:

displaying attraction information that identifies at least a plurality of candidate attractions, wherein the candidate attractions are attractions that are not previously recommended;

receiving a first user input comprising a selection of at least a single candidate attraction among the plurality of candidate attractions;

displaying property information that identifies a plurality of properties after receiving the first user input;

receiving a second user input comprising a selection of one or more properties among the plurality of properties; and associating the selected candidate attraction and the selected one or more properties to permit respective devices disposed at the one or more properties to display information of the selected candidate attraction.

[Supplemental Note 2]

The method of SUPPLEMENTAL NOTE 1, further comprising:

receiving a third user input comprising a selection of at least a single property having a new device; and displaying previously recommended attraction information associated with a plurality of previously recommended attractions after receiving the third user input.

[Supplemental Note 3]

The method of SUPPLEMENTAL NOTE 2, further comprising:

receiving a fourth user input comprising a selection of one or more attractions among the previously recommended attractions; and associating the selected property and the selected one or more attractions to permit the new device to display information of the selected one or more attractions.

[Supplemental Note 4]

The method of SUPPLEMENTAL NOTE 1, further comprising:

receiving a third user input comprising a selection of another candidate attraction among the plurality of candidate attractions; and associating the selected candidate attractions and the selected one or more properties.

[Supplemental Note 5]

The method of SUPPLEMENTAL NOTE 1, wherein the plurality of properties are rental properties.

[Supplemental Note 6]

The method of SUPPLEMENTAL NOTE 1, wherein the displaying the property information comprises displaying the property information via a single screen.

[Supplemental Note 7]

The method of SUPPLEMENTAL NOTE 1, wherein the plurality of properties are disposed within a threshold distance of the recommended attraction.

[Supplemental Note 8]

A non-transitory computer-readable medium comprising one or more instructions that, when executed by one or more processors, cause the one or more processors to:

display attraction information that identifies at least a plurality of candidate attractions, wherein the candidate attractions are attractions that are not previously recommended;

receive a first user input comprising a selection of at least a single candidate attraction among the plurality of candidate attractions;

display property information that identifies a plurality of properties after receiving the first user input;

receive a second user input comprising a selection of one or more properties among the plurality of properties; and associate the selected candidate attraction and the selected one or more properties to permit respective devices disposed at the one or more properties to display information of the selected candidate attraction.

[Supplemental Note 9]
The non-transitory computer-readable medium of SUPPLEMENTAL NOTE 8, wherein the one or more instructions are further configured to cause the one or more processors to:
receive a third user input comprising a selection of a property having a new device; and
display previously recommended attraction information associated with a plurality of previously recommended attractions after receiving the third user input.

[Supplemental Note 10]
The non-transitory computer-readable medium of SUPPLEMENTAL NOTE 9, wherein the one or more instructions are further configured to cause the one or more processors to:
receive a fourth user input comprising a selection of one or more attractions among the previously recommended attractions; and
associate the selected property and the selected one or more attractions to permit the new device to display information of the selected one or more attractions.

[Supplemental Note 11]
The non-transitory computer-readable medium of SUPPLEMENTAL NOTE 8, wherein the one or more instructions are further configured to cause the one or more processors to:
receive a third user input comprising a selection of another candidate attraction among the plurality of candidate attractions; and
associate the selected candidate attractions and the selected one or more properties.

[Supplemental Note 12]
The non-transitory computer-readable medium of SUPPLEMENTAL NOTE 8, wherein the one or more properties are rental properties.

[Supplemental Note 13]
The non-transitory computer-readable medium of SUPPLEMENTAL NOTE 8, wherein the property information is displayed via a single screen.

[Supplemental Note 14]
The non-transitory computer-readable medium of SUPPLEMENTAL NOTE 8, wherein the plurality of properties are disposed within a threshold distance of the recommended attraction.

[Supplemental Note 15] providing, by a server and to a management device, attraction information that identifies at least a plurality of candidate attractions to permit the management device to display the attraction information, wherein the candidate attractions are attractions that are not previously recommended;
receiving, by the server and from the management device, a selected candidate attraction based on a first user input to the management device comprising a selection of at least a single candidate attraction among the plurality of candidate attractions;
providing, by a server and to the management device, property information that identifies a plurality of properties to permit the management device to display the property information after receiving the first user input by the management device;
receiving, by the server and from the management device, selection information that identifies a user selection of one or more properties among the plurality of properties based on a second user input to the management device; and
providing, by the server, association information that associates the selected candidate attraction and the selected one or more properties based on the selection information.

[Supplemental Note 16]
The method of SUPPLEMENTAL NOTE 15, further comprising:
receiving, by the server and from the management device, a selection of a property having a new device based on a third user input to the management device; and
providing, by the server and to the management device, previously recommended attraction information associated with a plurality of previously recommended attractions after receiving the third user input by the management device.

[Supplemental Note 17]
The method of SUPPLEMENTAL NOTE 16, further comprising:
receiving, by the server and from the management device, a selection of one or more attractions among the previously recommended attractions based on a fourth user input to the management device; and
associating, by the server, the selected property and the selected one or more attractions to permit the new device to display information of the selected one or more attractions.

[Supplemental Note 18]
The method of SUPPLEMENTAL NOTE 15, further comprising:
providing, by the server and to respective devices disposed at the one or more properties among the plurality of properties, the attraction information to permit the devices to display the attraction information.

[Supplemental Note 19]
The method of SUPPLEMENTAL NOTE 15, wherein the property information is configured to be displayed via a single screen.

[Supplemental Note 20]
The method of SUPPLEMENTAL NOTE 15, further comprising:
providing, by the server and to the management device, the property information based on the plurality of properties being located within a threshold distance from the candidate attraction.

What is claimed is:
1. A method of generating a graphical user interface (GUI), comprising:
   displaying previously recommended attraction information of an attraction that was previously recommended;
   displaying attraction information that identifies at least a plurality of candidate attractions, wherein the candidate attractions are attractions that were not previously recommended, and wherein the candidate attractions indicate physical locations;
   receiving a first user input comprising a selection of at least a single candidate attraction among the plurality of candidate attractions;
   displaying property information that identifies a plurality of properties after receiving the first user input, the plurality of properties being buildings;
   receiving a second user input comprising a selection of one or more properties among the plurality of properties; and
   causing, based on the second user input, only respective devices associated with the one or more selected properties to display information of the selected candidate attraction.
2. The method of claim 1, further comprising:
   receiving a third user input comprising a selection of at least a single property having a new device; and
   displaying previously recommended attraction information that identifies a plurality of previously recommended attractions after receiving the third user input.

3. The method of claim 2, further comprising:
receiving a fourth user input comprising a selection of one or more attractions among the previously recommended attractions; and
causing, based on the fourth user input, the new device to display information of the selected one or more attractions.

4. The method of claim 1, further comprising:
receiving a third user input comprising a selection of another candidate attraction among the plurality of candidate attractions; and
causing, based on the third user input, the respective devices disposed at the one or more properties to display information of the selected other candidate attraction.

5. The method of claim 1, wherein the plurality of properties are rental properties managed by a property manager.

6. The method of claim 1, wherein the displaying the property information comprises displaying the property information via a single screen.

7. The method of claim 1, wherein the plurality of properties are disposed within a threshold distance of the recommended attraction that is capable of being visited by guests of the plurality of properties.

8. The method of claim 1, wherein the at least the plurality of candidate attractions are located outside of the plurality of properties.

9. The method of claim 1, wherein the causing comprises causing the respective devices disposed at the one or more properties to display, on a display of the respective devices, information of the selected candidate attraction associated with the one or more properties.

10. The method of claim 1, wherein the second user input comprises a selection of two or more properties among the plurality of properties, and wherein the causing comprises causing respective devices disposed at the two or more selected properties to display information of the selected single candidate attraction.

11. The method of claim 1, wherein the single candidate attraction is a restaurant or an event.

12. The method of claim 1, wherein the respective devices are disposed at the one or more selected properties.

13. A non-transitory computer-readable medium comprising one or more instructions that, when executed by one or more processors, cause the one or more processors to:
display previously recommended attraction information of an attraction that was previously recommended;
display attraction information that identifies at least a plurality of candidate attractions, wherein the candidate attractions are attractions that are not previously recommended, and wherein the candidate attractions indicate physical locations;
receive a first user input comprising a selection of at least a single candidate attraction among the plurality of candidate attractions;
display property information that identifies a plurality of properties after receiving the first user input, the plurality of properties being buildings;
receive a second user input comprising a selection of one or more properties among the plurality of properties; and
cause, based on the second user input, only respective devices associated with the one or more selected properties to display information of the selected candidate attraction.

14. The non-transitory computer-readable medium of claim 13, wherein the one or more instructions are further configured to cause the one or more processors to:
receive a third user input comprising a selection of a property having a new device; and
display previously recommended attraction information that identifies a plurality of previously recommended attractions after receiving the third user input.

15. The non-transitory computer-readable medium of claim 14, wherein the one or more instructions are further configured to cause the one or more processors to:
receive a fourth user input comprising a selection of one or more attractions among the previously recommended attractions; and
cause, based on the fourth user input, the new device to display information of the selected one or more attractions.

16. The non-transitory computer-readable medium of claim 13, wherein the one or more instructions are further configured to cause the one or more processors to:
receive a third user input comprising a selection of another candidate attraction among the plurality of candidate attractions; and
cause, based on the third user input, the respective devices disposed at the one or more properties to display information of the selected other candidate attraction.

17. The non-transitory computer-readable medium of claim 13, wherein the one or more properties are rental properties managed by a property manager.

18. The non-transitory computer-readable medium of claim 13, wherein the property information is displayed via a single screen.

19. The non-transitory computer-readable medium of claim 13, wherein the plurality of properties are disposed within a threshold distance of the recommended attraction that is capable of being visited by guests of the plurality of properties.

20. The non-transitory computer-readable medium of claim 13, wherein the respective devices are disposed at the one or more selected properties.

21. A method comprising:
providing, by a server and to a management device, previously recommended attraction information of an attraction that was previously recommended to permit the management device to display the previously recommended attraction information,
providing, by the server and to the management device, attraction information that identifies at least a plurality of candidate attractions to permit the management device to display the attraction information, wherein the candidate attractions are attractions that were not previously recommended, and wherein the candidate attractions indicate physical locations;
receiving, by the server and from the management device, a selected candidate attraction based on a first user input to the management device comprising a selection of at least a single candidate attraction among the plurality of candidate attractions;
providing, by a server and to the management device, property information that identifies a plurality of properties to permit the management device to display the property information after receiving the first user input by the management device, the plurality of properties being buildings;
receiving, by the server and from the management device, selection information that identifies a user selection of one or more properties among the plurality of properties based on a second user input to the management device; and causing, based on the selection information, only respective devices associated with the one or more selected properties to display information of the selected candidate attraction.

22. The method of claim 21, further comprising:
receiving, by the server and from the management device, a selection of a property having a new device based on a third user input to the management device; and providing, by the server and to the management device, previously recommended attraction information that identifies a plurality of previously recommended attractions after receiving the third user input by the management device.

23. The method of claim 22, further comprising:
receiving, by the server and from the management device, a selection of one or more attractions among the previously recommended attractions based on a fourth user input to the management device; and causing, based on the selection, the new device to display information of the selected one or more attractions.

24. The method of claim 21, further comprising:
providing, by the server and to respective devices disposed at the one or more properties among the plurality of properties, the attraction information to cause the devices to display the attraction information.

25. The method of claim 21, wherein the property information is configured to be displayed via a single screen.

26. The method of claim 21, further comprising:
providing, by the server and to the management device, the property information based on the plurality of properties being located within a threshold distance from the candidate attraction that is capable of being visited by guests of the plurality of properties.

27. The method of claim 21, wherein the respective devices are disposed at the one or more selected properties.

* * * * *